United States Patent [19]

Stauber

[11] 4,299,035
[45] Nov. 10, 1981

[54] SPIRIT LEVEL

[75] Inventor: Siegfried Stauber, Zurich, Switzerland

[73] Assignee: Wyler AG, Switzerland

[21] Appl. No.: 169,118

[22] PCT Filed: Mar. 1, 1979

[86] PCT No.: PCT/CH79/00035
§ 371 Date: Nov. 1, 1979
§ 102(e) Date: Oct. 17, 1979

[87] PCT Pub. No.: WO79/00672
PCT Pub. Date: Sep. 6, 1979

[51] Int. Cl.³ .................................................. G01C 9/28
[52] U.S. Cl. ...................................................... 33/386
[58] Field of Search ............ 33/379, 381, 383, 385–387

[56] References Cited
U.S. PATENT DOCUMENTS 1,163,203  12/1915  Berkebile ............................ 33/385
1,583,957  5/1926  Carrier .................................. 33/386
1,624,339  4/1927  Hapgood .............................. 33/383
2,301,769  10/1942  Babcock ............................... 33/386
2,519,211  8/1950  Wyler ................................... 33/386

Primary Examiner—Charles E. Phillips
Attorney, Agent, or Firm—McGlew and Tuttle

[57] ABSTRACT

Spirit level, whose level element (4) is adjustable relative to the measuring surface (30) by an adjusting device (28) in a locating area (24). The adjusting device (28) has for this purpose at least one set screw (44, 46, 48), whose conical or convex end (42) engages on a conical or convex edge located on a sleeve member (20) surrounding the level element, a supporting member (66, 68, 72, 74) fixed to one end of the level element or to the actual glass body of the level element. A spring member (51, 53) engages on the side of the conical or convex edge (40) facing the contact point with the set screw and serves to limit the magnitude of the adjusting force of the set screw.

18 Claims, 9 Drawing Figures

SPIRIT LEVEL

FIELD AND BACKGROUND OF THE INVENTION

In highly accurate spirit levels, it is necessary to true the level element very precisely with respect to the reference surface and/or measuring surface of the housing using adjusting means. Only in the case of low precision spirit levels is it adequate, following truing, to fix the level element by means of small wedges inserted between the level element and a housing cavity by pouring a rapidly solidifying material, e.g. gypsum or liquid sulphur into the gap between the ends of the level element and the housing cavity. In order to permit a fine adjustment, hitherto tubular level elements have been arranged in a metallic sleeve member and have been fixed in it by grouting, followed by the subsequent insertion in a hole in the housing and radial truing by adjusting means. The diameter of the hole in the housing must be that much larger than the external diameter of the sleeve member to permit such a radial adjustment. The adjusting means comprise, for example, at least three set screws which, with the same angular distance from one another, enclose a sleeve end between them. By turning the set screws, provided with a fine thread, a radial adjustment of the end of the sleeve member in the direction of the particular radially directed set screw being actuated is obtained and the sleeve member rotates about its facing end, so that the angle can be varied to such an extent relative to the reference surface of the housing until the level element axis is precisely parallel or vertical to said reference or measuring surface. A similar adjusting possibility can be provided on the opposite end of the sleeve member if there is no centering mounting support there.

Adjustment by means of set screws acting on at least three peripheral points of the sleeve member has the disadvantage that the magnitude of the force produced by the set screw is uncontrolled. Deformation of the sleeve occurs and the relationship between elastic and plastic deformation, partly also on the sleeve surface, changes after a certain time, particularly due to vibrations so that the precision of the spirit level does not remain constant. As a result of the imprecise magnitude of the forces which occur, it is, in particular, not possible to do away with a sleeve member enclosing the level element, because the generally glass level elements can only absorb local pressures.

SUMMARY OF THE INVENTION

The problem of the present invention is to provide a spirit level which can be adjusted with higher precision in a simple manner and has an almost constant degree of precision. It must also be easy to manufacture and permit a construction allowing adjustability also about the longitudinal axis of a tubular level element.

This problem is solved by a spirit level of the type having a housing, a cylindrical level element mounted in the housing, an adjusting means having at least one set screw for finely adjusting the level element with respect to a reference surface of the housing, the level element having one side pivotally mounted to the housing, and the adjusting means being engaged on the side of the level element opposite the one side, a spring member engaged on the level element, the adjusting means having at least one set screw with a conical peripheral surface, the conical peripheral surface of the screw being convex in the longitudinal direction of the screw and engaged on the level element, and the screw adjustably engaging the level element with a force oppositely directed to the spring tension of the spring member, the spring member engaged to the level element at a distance from the contact point of the peripheral surface of the screw, the improvement comprising the at least one set screw arranged at least approximately axially parallel to the level element and the peripheral surface of the screw, the level element having a peripheral surface with a diameter larger than the internal diameter of the level element, the spring member being engaged in the area of the peripheral surface of the level element, a common member, the set screw and the spring member being held in the common member, the common member being rotatable about an axis which is the same as the level element axis, and securing means for fixing the common element in different rotation positions.

The invention is explained in greater detail hereinafter relative to embodiments and the attached drawings, wherein.

DETAILED DESCRIPTION

Figure 1:
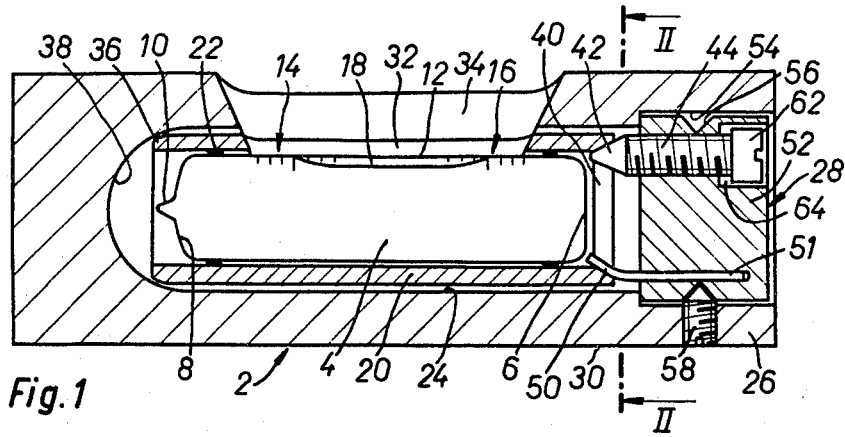
FIG. 1 is a vertical section in the direction of the longitudinal axis of the level element through a spirit level.

The spirit level 2, according to FIG. 1, has a tubular level element 4 made from glass with a base 6 moulded in one piece. End 8 of the level element facing the base is closed by melting after filling with e.g. alcohol, as is shown by closing tip 10. There are two scale areas 14, 16 on the top 12 of the level element, so that the position of both ends of the enclosed air bubble 18 which face one another in the longitudinal direction of the level element can be read. The air bubble attempts to migrate to the highest point of a large radius convexity ground into the inner wall of the level element. This convexity is so slight that it is not visible to FIG. 1. Furthermore, this representation does not correspond to a scale reproduction of the sizes of the individual components and, in particular, the level element diameter is generally considerably smaller in the case of the represented spirit level size.

Level element 4 is enclosed and fixed in a sleeve member 20. The level element can be fixed in sleeve member 20 by pouring a rigid not shown material around the ends of the level element and this penetrates the space between the outer wall of the level element and the inner wall of the sleeve member up to a sealing ring 22 and then solidifies.

Sleeve member 20 is in turn held in a locating bore 24 of housing 26 of spirit level 2 and by means of adjusting device 28 can be very accurately aligned with respect to the reference surface 30 of the spirit level. An elongated opening 32 or 34 is provided at the top of both sleeve member 20 and housing 26 to make it possible to see the scale areas 14, 16 of the level element 4.

Figure 2:
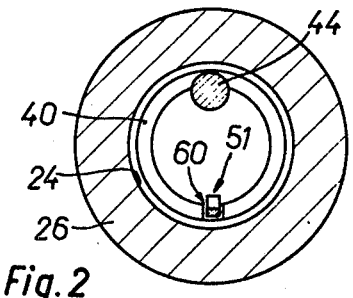
FIG. 2 is a section along the line II—II of FIG. 1.
Figure 3:
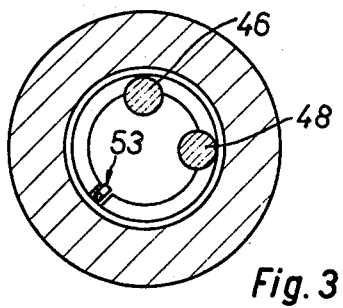
FIG. 3 is a section according to FIG. 2 of a modified embodiment of the very basic arrangement of FIG. 1.

The peripheral edge 36 of one end of sleeve member 20 engages on the spherically shaped end 38 of housing locating bore 24 and is consequently pivotably mounted and centered. In the area of the other end of sleeve member 20, there is a conical inner edge 40, or such an inner edge which is curved in the longitudinal direction of the level element, and on said edge engages the conical end 42 of at least one set screw 44 (FIG. 2) or 46, 48 (FIG. 3), as well as the curved end 50 of a spring rod 51 or 53. The contact point of the spring rod arcuately faces set screw 44 or set screws 46, 48, so that the radially directed spring tension of the spring rod counteracts the controlling force of set screw 44 directed radially to sleeve member 20. In the example of FIG. 3, the radial controlling force of the two set screws 46, 48 act counter to an oppositely directed force component of spring rod 53. Thus, the controlling force of the set screws cannot be larger than the spring tension of the spring rod and consequently a dimensional change of the sleeve member is prevented by radial and axial forces of set screws. This spring tension also remains unchanged after a long time, so that there is no change to the setting even under the effect of impacts. The limiting of the controlling force of the set screws also makes the use of a sleeve member 20 superfluous, because the controlling forces which occur can be absorbed by the level element 4. Corresponding embodiments of the invention are shown in FIGS. 4 to 9.

Set screws 44, 46, 48 having a fine thread are in each case screwed into a threaded hole of a cylindrical terminating member 52 inserted in a widened portion 54 of the housing bore and which is secured in position by a pressure screw 58 engaging in an all-round notch 56. Spring rod 51 or 53, which can have different cross-sectional shapes, e.g. round, rectangular, etc is also held in member 52.

Preferably, a depression 60 in which engages the end 50 of the spring rod is located in the inner edge 40 of the sleeve member 20. Thus, a rotation of the terminating member 52 about its axis is transferred to the sleeve member 20, thus permitting an adjustment about its longitudinal axis of the angular position of the level element. The various rotation positions of the terminating member 52 can be fixed by the pressure screw 58.

For limiting the adjusting movement of the set screws, the latter are provided by a head 62 received by a countersink 64 of terminating member 52. Scale-like markings can be provided on the edge of the countersink and a marking on the screw head permits an accurate setting of a particular adjusting movement of the set screw.

As a result of the fine thread of the set screws and the cone angle of the screw end, there is a large transmission ratio of the rotary movement of the screw to the radial movement of the end of sleeve member 20 and a correspondingly accurate adjusting possibility is provided. Instead of being conical, the screw end can be curved in convex or concave manner in the longitudinal direction and the same applies to the conical inner edge 40, or the inner edge 40 which is curved in the longitudinal direction for sleeve member 20. As far as possible, the shape is chosen in such a way that despite the adjustment of the set screws in their axial direction, the contact point between screw end 42 and inner edge 40 of the sleeve member is located in the same radial plane as the contact point between the end 50 of the spring rod and the inner edge 40, so that no bending forces act on the sleeve member.

Figure 9:
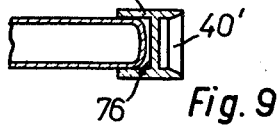
FIG. 9 is part of a tubular level element with a mounted end piece for the engagement of the adjusting means.

FIGS. 4 to 6, 8 and 9 show embodiments of the spirit level in which supporting member 66, 68, 70, 72 or 74 are fixed to the ends of the glass body of the level element in place of a sleeve member 20 in which the sleeve member is fixed. Such constructions are possible because the glass body of the level element can transfer to the other end or the opposite supporting member the adjusting forces occurring at one end thereof. In the embodiment of FIG. 9, a level element according to FIG. 1 is used sealed at both ends by a glass wall. The level elements ends, only one of which is shown in FIG. 9, are rigidly held in a holding member 76 by being fixed therein by a moulding compound or by adhesion. The outer end of supporting member 74 has a conical inner edge 40' corresponding to inner edge 40 of the embodiment of FIG. 1.

In the embodiments according to FIGS. 4 to 6 and 8, the supporting member 66, 68, 70, 72 also serves as a closure for, in each case, one end of glass tube 78, 80, 82, 84 which, together with its two closures forms a level element. The closures either engage in the glass tube, as in the embodiments of FIGS. 4, 5 and 8, or surrounded with a holding edge 86 as in the embodiment of FIG. 6. A sealing adhesive material 88 is provided between the contact surfaces to provide a reliable seal. The inner edge 90 of supporting member 68 of FIG. 3 provided for contact with end 42' of set screw 44' is convex and is also provided with a depression 92 for the engagement of a not shown spring rod.

Figure 4:
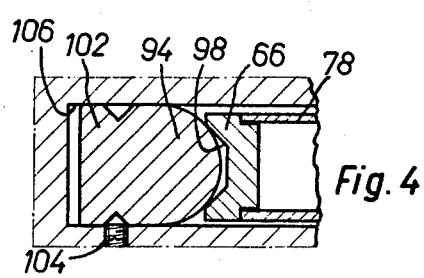
FIG. 4 is a further embodiment of the mounting of the end of a tubular level element facing the end having adjusting means.
Figure 6:
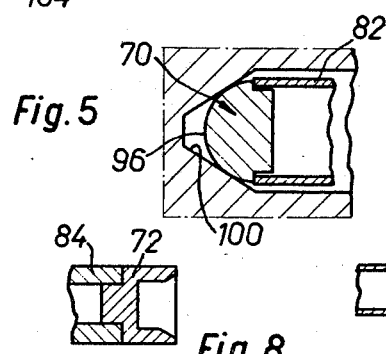
FIG. 6 is a further embodiment of a level element end on which act the adjusting means.
Figure 5:
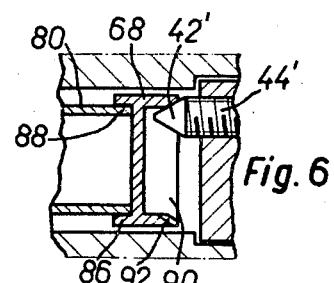
FIG. 5 is a further embodiment of the mounting of said level element end.

FIGS. 4 and 5 show further embodiments of the pivotable mounting and centering of one level element end, a spherical member 94 or 96 cooperating with a conical surface 98 or 100. In the embodiment of FIG. 4, the spherical member 98 is provided at the end of a cylindrical bearing 102 which is secured at the end of housing bore 106 by a pressure screw 104.

Figure 7:
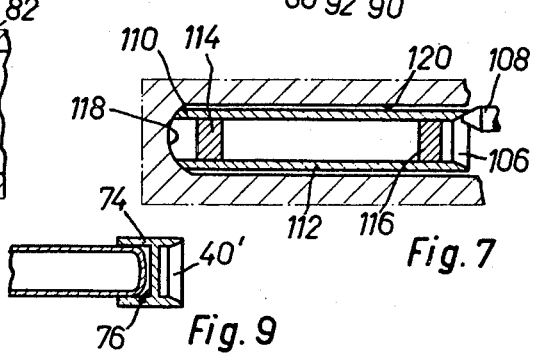
FIG. 7 is a partial longitudinal section through a spirit level whose level element engages on one side on the inner wall of the housing and on the other side on the adjusting means.
Figure 8:
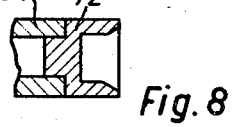
FIG. 8 is a level element end with a closure constructed for contact with the adjusting means.

The partial section of FIG. 7 shows a further embodiment of the spirit level in which both a sleeve member 20 and supporting members at the ends of a glass tube are eliminated in that the inner edge 106 for the engagement of the end 108 of at least one set screw as well as a conical terminal edge 110 at the other end of the level element are shaped directly onto a glass tube 112 which forms the level element. The level element liquid is enclosed between two sealing members 114, 116 inserted into the ends of glass tube 112 and which are tightly connected to the inner wall thereof.

In this embodiment, end 108 of the set screw is provided with a peripheral surface which is curved in convex manner in the direction of the longitudinal axis of the screw, whilst the inner edge 106 is conical. The other end 110 of glass tube 112 engages on a spherical surface 118 in the base of the locating hole 120.

Since, due to its manufacture, the level element is made from a transparent material such as glass, plastic, etc., and generally has a different coefficient of thermal expansion relative to housing 26, differences in the set adjusting position would occur in the case of temperature variations. However, as the terminating member 52 is in the form of a separate part its material and therefore thermal expansion coefficient can be selected in such a way that the differing thermal expansion between level element and housing is compensated.

What is claimed is:

1. An improved spirit level of the type having a housing, a cylindrical level element mounted in the housing, and adjusting means having at least one set screw for finely adjusting the level element with respect to a reference surface of the housing, the level element having one side pivotally mounted to the housing, and the adjusting means being engaged on the side of the level element opposite the one side, a spring member engaged on the level element, the adjusting means having at least one set screw with a conical peripheral surface, the conical peripheral surface of the screw being convex in the longitudinal direction of the screw and engaged on the level element, and the screw adjustably engaging the level element with a force oppositely directed to the spring tension of the spring member, the spring member being engaged to the level element at a distance from the contact point of the peripheral surface of the screw, the improvement comprising the at least one set screw arranged at least approximately axially parallel to the level element and the peripheral surface of the screw, the level element having a peripheral surface with a diameter larger than the internal diameter of the level element, the spring member being engaged in the area of the peripheral surface of the level element, a common member, the set screw and the spring member being held in said common member, said common member being rotatable about an axis which is the same as the level element axis, and securing means for fixing said common element in different rotation positions.

2. A spirit level according to claim 1, wherein the spring member comprises a bending rod.

3. A spirit level according to claims 1 or 2, wherein the peripheral surface of the level member includes a depression and the spring member is fixedly engaged in the depression with respect to the level element, so that the angular position of the latter, relative to its longitudinal axis, is fixed by the spring member.

4. A spirit level according to claim 3, wherein the housing includes a bore for housing the level element, and the common member has a cylindrical outer surface guidingly received in said bore.

5. A spirit level according to claims 1 or 2, wherein the peripheral surface of the level element has one of a conical inner edge and an inner edge which is curved in the direction of the level element axis.

6. A spirit level according to claim 2, wherein said bending rod has an end fixedly engaged on the peripheral surface of the level element, said end of said bending rod being curved, said end of said bending arm having a contact point on said peripheral surface of the level element on the outside of the curved portion.

7. A spirit level according to claim 1, wherein the housing has a spherical surface, the side of the level element opposite the side provided with the adjusting means being pivotally centered by the spherical surface.

8. A spirit level according to claim 1, wherein the level element has a spherical surface on the side of the level element opposite the side provided with the adjusting means whereby the level element is pivotably centered to the housing.

9. A spirit level according to claim 1 wherein the level element comprises at least one glass tube, a supporting member mounted to said glass tube, said glass tube being sealed at one side by said supporting member, said supporting member having a contact surface for the pivotably and centeringly mounting support of one level element end to the housing.

10. A spirit level according to claim 9, wherein said contact surface comprises a peripheral surface fixed with respect to the level element.

11. A spirit level according to claim 1, further comprising a supporting member mounted to the one side of the level element, said supporting member having a holding portion, wherein the level element is held in said holding portion, and said supporting member having a contact surface for pivotably mounting and fixedly centering the level element.

12. A spirit level according to claim 1, wherein the housing includes a bore, the level element comprises a glass tube having one end engaged on the wall of the bore of the housing and an opposite end including said level element peripheral surface fixed with respect to the level element, and two sealing members mounted to the tube to enclose a fluid inserted into the tube between said two sealing members.

13. A spirit level according to claim 1, wherein the set screw comprising a plurality of set screws arranged with an angular distance of 90° about the level element axis is provided for the vertical setting on the one hand and the horizontal setting on the other end of the level element.

14. A spirit level according to claim 1, said level element comprises a part rigidly connected to the level element, the conical peripheral surface of the screw being engaged on said part, and said part including said peripheral surface with a diameter larger than the internal diameter of the level element.

15. A spirit level according to claim 14, wherein the spring member comprises a bending rod.

16. A spirit level according to claim 15, wherein said peripheral surface of the level member includes a depression and the spring member is fixedly engaged in the depression with respect to the level element, so that the angular position of the latter, relative to its longitudinal axis, is fixed by the spring member.

17. A spirit level according to claim 14, wherein said bending rod has an end fixedly engaged on the peripheral surface of the level element, said end of said bending rod being curved, said end of said bending arm having a contact point on said peripheral surface of the level element on the outside of the curved portion.

18. A spirit level according to claim 14, wherein said part includes a spherical surface on the side of the level element opposite the side provided with the adjusting means whereby the level element is pivotably centered to the housing.

* * * * *